United States Patent [19]
Wakebe et al.

[11] Patent Number: 5,310,331
[45] Date of Patent: May 10, 1994

[54] INJECTION MOLDING MACHINE WITH A MOLD CORE DRIVE APPARATUS

[75] Inventors: Shuichi Wakebe, Oshino; Hisaaki Matsui, Tama; Motohiro Nagaya, Oshino, all of Japan

[73] Assignee: Fanuc Ltd, Minamitsuru, Japan

[21] Appl. No.: 829,051

[22] PCT Filed: May 23, 1991

[86] PCT No.: PCT/JP91/00694
§ 371 Date: Feb. 10, 1992
§ 102(e) Date: Feb. 10, 1992

[87] PCT Pub. No.: WO91/19599
PCT Pub. Date: Dec. 26, 1991

[30] Foreign Application Priority Data
Jun. 16, 1990 [JP] Japan .................. 2-156653

[51] Int. Cl.$^5$ .................................. B29C 45/80
[52] U.S. Cl. ........................... 425/139; 249/59;
264/318; 264/334; 425/468; 425/556; 425/577;
425/809; 425/DIG. 58
[58] Field of Search ............. 425/139, 165, 468, 556,
425/577, 809, DIG. 58; 264/40.4, 334, 318;
249/59

[56] References Cited
U.S. PATENT DOCUMENTS

| | | | |
|---|---|---|---|
| 3,712,786 | 1/1973 | Aoki | 264/318 |
| 4,988,273 | 1/1991 | Faig et al. | 425/150 |
| 5,052,908 | 10/1991 | Inaba et al. | 425/150 |

FOREIGN PATENT DOCUMENTS

| | | |
|---|---|---|
| 10423 | 1/1986 | Japan . |
| 80016 | 4/1987 | Japan . |
| 71722 | 3/1989 | Japan . |
| 68816 | 5/1989 | Japan . |
| 108715 | 7/1989 | Japan . |
| 224816 | 9/1989 | Japan . |
| 19520 | 2/1990 | Japan . |

Primary Examiner—Tim Heitbrink
Attorney, Agent, or Firm—Staas & Halsey

[57] ABSTRACT

In a core drive apparatus for an injection molding machine, a servomotor is used as a drive source to drive movable cores which, in conjunction with mold parts, define molding cavities. The servomotor is connected to a control device for controlling the drive of various injection molding machine units including the servomotor. The servomotor is connected to the movable cores by a driven shaft, gears, and screw shafts formed integrally with the movable cores, by attaching a movable mold body to a movable mold mounting section supporting the driven shaft. One end of the driven shaft is fitted on an output shaft of the servomotor attached to a movable platen so that attachment of a mold to the molding machine is facilitated.

12 Claims, 3 Drawing Sheets 5,310,331

INJECTION MOLDING MACHINE WITH A MOLD CORE DRIVE APPARATUS

BACKGROUND OF THE INVENTION

1. Field of the Invention

The present invention relates to an injection molding machine with a core drive apparatus for driving a movable core of a mold used in molding a product having an undercut portion, and more particularly, to a core drive apparatus capable of being easily connected with a movable core and accurately driving the movable core.

2. Description of the Related Art

In injection molding operation, a molding cavity of a mold is filled with a molten resin, and the filler resin is cooled and solidified in the molding cavity, whereupon a product is obtained. If the shape of the product is simple, the product can be taken out of the mold by only separating a movable-side mold half from a stationary-side mold half and pushing the product out of the movable-side mold half. If the product has an undercut portion, thread portion, or hollow portion, however, it sometimes cannot be taken out of the mold. For example, the movable-side mold half may be prevented from moving away from the stationary-side mold half by the undercut portion of the product, or the product may be prevented from being pushed out of the movable-side mold half, due to the engagement between the thread portion or hollow portion of the product and its corresponding portion of the movable-side mold half.

In molding the product of this type, therefore, a mold is used in which a mold portion (movable core) corresponding to the undercut portion or the like of the product is movable with respect to the remaining portion of the mold. The movable core is separated from the movable- and stationary-side mold halves by being driven by means of a mechanical core drive mechanism, such as an angular pin, angular cam, etc., or a fluid-operated core drive mechanism, such as a hydraulic cylinder apparatus or pneumatic motor, whereby the movable-side mold half can be moved away from the stationary-side mold half, or the product can be released from the mold.

In molding a product which has indentations (undercut portion) on its outer peripheral surface, for example, a mold is used which includes a slide core attached to a movable-side mold half so as to be movable in a direction perpendicular to the mold opening and closing direction and used to mold the indentations of the product. In this case, a molten resin is filled into a molding cavity and solidified in a manner such that the slide core is locked in a molding position by means of a locking block. Subsequently, the movable-side mold half is moved away from the stationary-side mold half after the slide core is unlocked, whereby the slide core is disengaged from the product along an angular pin, which extends at an angle to the mold opening and closing direction and has one end fixed to the stationary-side mold half, so that the product can be pushed out of the mold.

Although the mechanical core drive apparatus of this type has a simple construction, it can only linearly move the movable core. The movable core must be rotated, on the other hand, in drawing the product out of the movable core having a thread portion corresponding to the thread portion of the product. Accordingly, the mechanical core drive apparatus is not fit for the molding of the product having the thread portion.

The fluid-operated core drive apparatus, which requires a working fluid source and a tube for connecting the working fluid source and the core drive apparatus, is complicated in construction. Thus, the connection between the movable core and the core drive apparatus costs much labor, so that attaching the mold to the injection molding machine takes much time, resulting in lower operating efficiency. Further, a control device for controlling the drive of the fluid-operated core drive apparatus is provided separately from a control device which is conventionally provided for the injection molding machine in order to control the operations of an injection unit, mold clamping unit, product takeout unit, etc. Depending on the core drive apparatus which operates under the control of the former control device, therefore, the operating timing, operating speed, or operating stroke of the movable core sometimes cannot be accurately controlled in association with molding cycles executed by means of the various units under the control of the letter control device.

SUMMARY OF THE INVENTION

The object of the present invention is to provide an injection molding machine with a core drive apparatus capable of being easily connected with a movable core, which constitutes part of a mold used in molding a product having an undercut portion, thread portion, or hollow portion, and accurately driving the movable core.

In order to achieve the above object, an injection molding machine according to the present invention comprises a control device for controlling the drive of a group of units, including a mold clamping unit having a movable platen, and a core drive apparatus for driving a movable core constituting part of a mold, the core drive apparatus including a servomotor having an output shaft, attached to the movable platen, and connected electrically to the control device, and connecting means for operatively connecting the movable core to the servomotor output shaft.

According to an aspect of the present invention, the core drive apparatus comprises a servomotor, adapted to operate so as to rotate the output shaft thereof, and connecting means including a driven shaft releasably fitted on the servomotor output shaft and rotatably supported by means of the mold, a screw shaft connected to the movable core and threadedly engaged with a tapped hold formed in the mold, and a transmission mechanism for transmitting the rotatory force of the driven shaft to the screw shaft. The transmission mechanism is formed of, for example, a pair of gears fixed individually to the driven shaft and the screw shaft and in mesh with each other.

According to another aspect of the present invention, the core drive apparatus comprises a servomotor, adapted to operate so as to rotate the output shaft thereof, and connecting means including a first driven shaft releasably fitted on the servomotor output shaft and rotatably supported by means of the mold, a second driven shaft rotatably supported by means of the mold, a screw shaft connected to the movable core and threadedly engaged with a tapped hole formed in the mold, a first transmission mechanism for transmitting the rotatory force of the first driven shaft to the second driven shaft, and a second transmission mechanism for transmitting the rotatory force of the second driven shaft to the screw shaft. The first transmission mechanism is formed of, for example, a belt for operatively connecting the first driven shaft to the second driven shaft, and the second transmission mechanism is formed of, for example, a pair of gears fixed individually to the second driven shaft and the screw shaft and in mesh with each other.

According to still another aspect of the present invention, the core drive apparatus comprises a servomotor, adapted to operate so as to move the output shaft thereof in the axial direction, and connecting means including a connecting shaft removably attached to the movable core, and a connector for connecting the connecting shaft to the servomotor output shaft.

According to the present invention, as described above, the core drive apparatus is composed of the servomotor, attached to the movable platen of the mold clamping unit, and the connecting means for connecting the movable core to the servomotor output shaft. In attaching the mold to the mold clamping unit, therefore, the core drive apparatus and the movable core of the mold can be connected to each other by only connecting the movable core to the servomotor output shaft by means of the connecting means. Thus, the mold can be easily attached to the mold clamping unit. According to the aspect in which the connecting means includes the driven shaft, screw shaft, and transmission mechanism, for example, the core drive apparatus and the movable core can be connected to each other by only fitting the driven shaft, attached to the mold, on the servomotor output shaft, and on the other hand, connecting the driven shaft and the screw shaft by means of the transmission mechanism after screwing the screw shaft, connected to the movable core, into the tapped hole of the mold. Also in the second aspect in which the connecting includes the first and second driven shafts, screw shaft, and first and second transmission mechanisms, the core drive apparatus and the movable core can be easily connected to each other. In the third aspect in which the connecting means includes the connecting shaft and the connector, it is necessary only that the connecting shaft connected to the movable core be connected to the servomotor output shaft by means of the connector.

According to the present invention, moreover, the servomotor of the core drive apparatus is connected to the control device for controlling the drive of the unit group for executing molding cycles, so that the unit group and the servomotor can be operated under the control of the common control device. Thus, the movable core can be accurately driven for a predetermined stroke with a predetermined timing and at a predetermined speed, in association with the molding cycles.

DESCRIPTION OF THE PREFERRED EMBODIMENT

Figure 1:
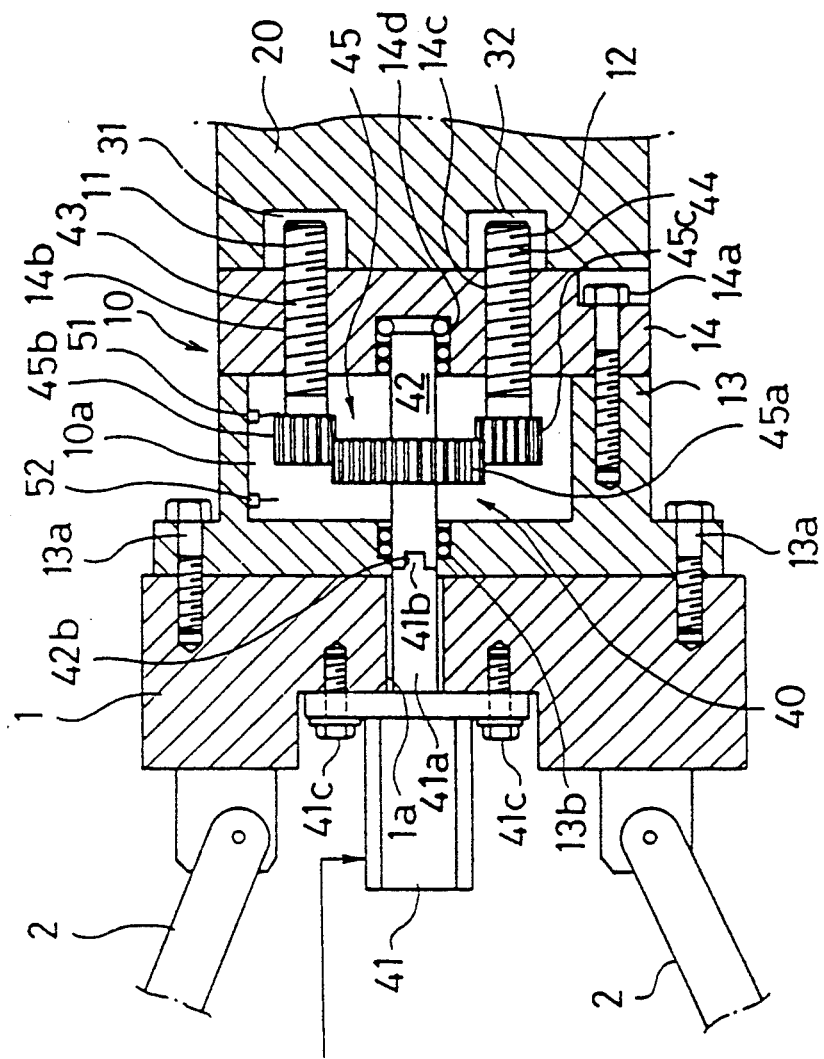
FIG. 1 is a front view, partially in section, showing a core drive apparatus of an injection molding machine according to a first embodiment of the present invention and its peripheral elements.
Figure 1:
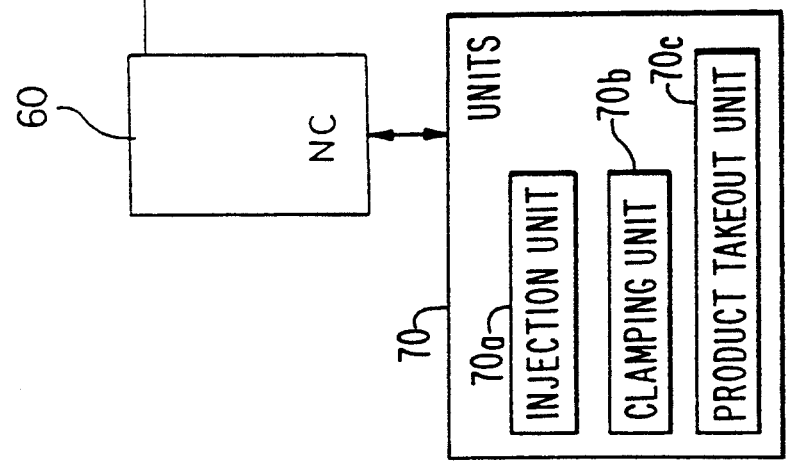

As shown in FIG. 1, an injection molding machine comprises a control device 60 and various units 70, which include an injection unit 70a, a mold clamping unit 70b and a product takeout unit 70c. The units 70 are operated under the control of the control device 60 to repeatedly execute molding cycles, which includes processes of mold clamping, metering, injection, dwell, cooling, mold opening, and product takeout. Preferably, drive sources for the individual units 70 are formed of a servomotor each.

The control device 60 is preferably formed of a computer numerical control device. The numerical control device 60 (not shown in detail) includes a first processor for numerical control, which is connected to a memory stored with numerical control programs, servo circuits for the various units, etc., and a second processor for a programmable machine controller, which is connected to a memory stored with sequence programs and the like. The control device 60 further includes a common memory accessible to both the first and second processors and stored with operation programs for molding cycle control, a data input device, input and output circuits, etc.

Referring to FIG. 1, the mold clamping unit includes a servomotor (not shown) for mold clamping and a movable platen 1, which is connected to a rear platen (not shown) through a toggle mechanism having two toggle links 2. As the servomotor for mold clamping rotates forwardly and reversely, the toggle links 2 bend and stretch to move the movable platen 1 toward and away from a stationary platen (not shown), thereby effecting mold closing and opening operations. Movable- and stationary-side mold halves (hereinafter referred to as movable and stationary molds) 10 and 20 are releasably attached to the movable and stationary platens, respectively. The movable mold 10, in conjunction with the stationary mold 20, defines one or more molding cavities which correspond to one or more molded pieces which have an undercut portion or portions, thread portion(s), or hollow portion(s). To allow the molded pieces of these types to be taken out from the mold, one or more movable cores corresponding to one or more undercut portions, thread portions, or hollow portions are movably attached to the movable or stationary mold 10 or 20 corresponding thereto.

In a first embodiment of the present invention shown in FIG. 1, the movable and stationary molds 10 and 20 define, respectively, first and second molding cavities 31 and 32 of the same shape and size used to form a cap (product) which has a bottomed tapped hole therein extending in the mold opening and closing direction. More specifically, the movable mold 10 includes first and second movable cores 11 and 12, each having an external thread on the outer peripheral surface thereof mating with the tapped hole of each product, a mold mounting section 13 removably attached to the movable platen 1 by means of bolts (two of which are denoted by numeral 13a), and a movable mold body 14 fixed to that end face of the mold mounting section 13 on the side remoter from the movable platen by means of bolts (one of which is denoted by numeral 14a). The mold mounting section 13, in conjunction with the mold body 14, defines a hollow portion 10a. The mold body 14 is formed having first and second tapped holes 14b and 14c, which extend penetrating the body 14 in the mold opening and closing direction (axial direction) and are aligned with the first and second molding cavities 31 and 32, respectively.

Reference numeral 40 denotes a core drive apparatus for moving the first and second movable cores 11 and 12 in the axial direction. The core drive apparatus 40 comprises a servomotor 41 fixed to that end face of the movable platen 1 on the side remoter from the molds by means of bolts (two of which are denoted by numeral 41c), a driven shaft 42 rotatable by means of the motor 41, and first and second screw shafts 43 and 44 formed integrally with the first and second movable cores 11 and 12, respectively, at the stationary-mold-side end portions thereof. Further, the apparatus 40 comprises a transmission mechanism 45 for transmitting the rotatory force of the driven shaft 42 to each of the first and second screw shafts 43 and 44. The servomotor 41, which is connected electrically to the output circuit of the control device 60, is operated under the control of the control device 60.

More specifically, the servomotor 41 has an output shaft 41a which extends penetrating an axial hole 1a formed in the central potion of the movable platen 1. The motor output shaft 41a terminates in an axial hole 13b, which is formed in the mold mounting section 13 so as to be in alignment with the movable platen axial hole 1a, and a projection 41b is formed on the distal end face of the shaft 41a. One end portion of the driven shaft 42 is rotatably supported on the mold mounting section 13 by means of a radial bearing disposed in the axial hole 13b, and a recess 42b to mate with the projection 41b is formed in the distal end face of the shaft 42. Further, the other end portion of the driven shaft 42 is supported on the movable mold body 14 so as to be rotatable and axially immovable, by means of a radial bearing and a thrust bearing arranged in a bottomed hole 14d, which is formed in the inner end face of the movable body 14 so as to be in alignment with the axial hole 13b. Thus, the driven shaft 42 is rotatable integrally with the motor output shaft 41a.

The first screw shaft 43 has the same external thread on its outer peripheral surface as the one formed on the first movable core 11, and is threadedly engaged with the tapped hole 14b formed in the movable mold body 14. Likewise, the second screw shaft 44 has an outer peripheral surface with the same external thread as that of the second movable core 12, and is threadedly engaged with the tapped hole 14c. The first and second screw shafts 43 and 44 are axially movable along the tapped holes 14b and 14c, so that the first and second movable cores 11 and 12 can get into and out of the first and second molding cavities 31 and 32, respectively. The transmission mechanism 45 is composed of a main spur gear 45a, fixed to the middle portion of the driven shaft 42, and first and second auxiliary spur gears 45b and 45c fixed to the respective movable-platen-side ends of the first and second screw shafts 43 and 44, both the gears 45b and 45c being in mesh with the main gear 45a.

Reference numerals 51 and 52 denote first and second position sensors, respectively, for detecting the moved position of the first movable core 11. The two sensors 51 and 52, which are each formed of, e.g., a limit switch, are connected electrically to the input circuit of the control device 60, and are isolatedly fixed on the inner surface of the peripheral wall of the movable mold mounting section 13. More specifically, the first limit switch 51 is fixed in a position such that it is turned on by means of that end face of the first auxiliary spur gear 45b on the side remoter from the movable platen when the distal end of the first movable core 11 takes a molding position in the first molding cavity 31. On the other hand, the second limit switch 52 is fixed in a position such that it is turned on by means of the movable-platen-side end face of the first auxiliary spur gear 45b when the distal end of the first movable core 11 leaves the first molding cavity 31. Thus, in the present embodiment, the molds, the movable core, and the position sensors are arranged so as to be fit for one specific type of molded pieces only.

The following is a description of the operation of the injection molding machine of FIG. 1.

Basically, the injection molding machine operates in the conventional manner. More specifically, the various units of the injection molding machine are driven in accordance with the operation programs by means of the first and second processors of the numerical control device 60, whereby the molding cycles are repeatedly executed. During the execution of the molding cycles, both the processors refer, as required, to that one of mold files stored in the common memory which corresponds to the type of the mold used, so that the executed molding cycles are fit for the mold used.

When a mold clamping completion signal is written in the common memory by means of the first processor for monitoring the progress of the mold clamping process, during the execution of the mold clamping process, the second processor drives the servomotor 41 of the core drive apparatus 40 to rotate forward at a predetermined rotating speed. Thereupon, the main gear 45a, fixed to the driven shaft 42 which is connected to the motor output shaft 41a, rotates forward, so that the first and second auxiliary gears 45b and 45c rotate forward. As a result, the first and second screw shafts 43 and 44 advance while rotating, so that the first and second movable cores 11 and 12 axially move from a retreated position to the molding position at a predetermined speed. When the distal end of the first movable core 11 reaches the molding position, thereby turning on the first limit switch 51, the rotation of the core drive motor 41 is stopped, so that the movement of the first and second movable cores 11 and 12 is stopped, and the respective distal ends of the movable cores 11 and 12 are kept in the molding position.

Subsequently, the injection, dwell, and cooling processes are executed in succession, the first and second molding cavities 31 and 32 are filled with a molten resin, and the filler resin is cooled and solidified, whereupon a product is obtained. Then, the mold opening process is started, whereupon a mold clamping motor is driven to move the movable platen 1 away from the stationary platen. In the meantime, the first processor monitors the moved position of the movable platen 1, and writes a mold opening completion signal in the common memory when the movable platen 1 reaches a mold opening completion position where it is separated from the stationary platen. In response to this, the second processor drives the core drive motor 41 reversely, thereby retreating the first and second movable cores 11 and 12 from the molding position to the retreated position. When the first movable core 11 reaches the retreated position, thereby turning on the second limit switch 52, the drive of the motor 41 is stopped, so that the first and second movable cores 11 and 12 are kept in the retreated position. Then, the product takeout unit is actuated to take out the product from the movable mold 10.

The following is a description of a core drive apparatus according to a second embodiment of the present invention.

The present embodiment differs from the first embodiment, in which the servomotor for core drive is attached to that end face of the movable platen on the opposite side to the mold mounting surface thereof, in that the servomotor for core drive is mounted on the top face of a movable platen. Thus, it is unnecessary to provide a space for the arrangement of the core drive servomotor on that end face of the movable platen on the opposite side to the mold mounting surface thereof, so that a product takeout unit and the like can be easily arranged on the end face of the movable platen.

Basically, the core drive apparatus is constructed in the same manner as the apparatus of FIG. 1. Therefore, like numerals are used to designate those components which are common to FIGS. 1 and 2, and a description of the common components is omitted.

Figure 2:
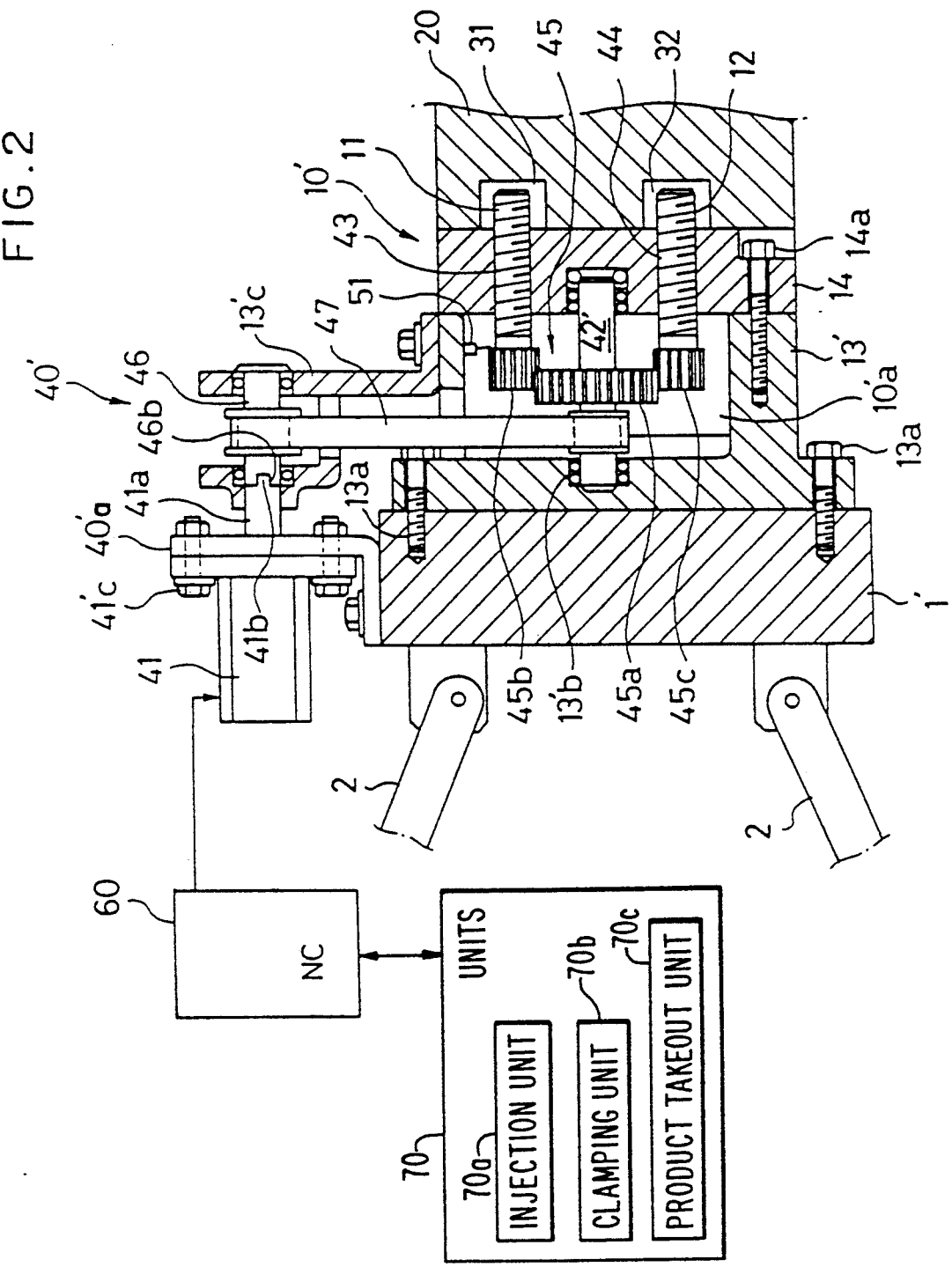
FIG. 2 is a view similar to that of FIG. 1, and shows an injection molding machine according to a second embodiment of the present invention.

Referring to FIG. 2, the core drive apparatus 40' comprises the servomotor 41, fixed on the top face of the movable platen 1' by means of a bracket 40'a, and a first driven shaft 46 rotatably supported by means of a bracket 13'c which is fixed to the top face of a movable mold mounting section 13'. The driven shaft 46 is mounted on the bracket 13'c so as to be axially immovable by using suitable means (not shown). The motor output shaft 41a and the first driven shaft 46, each extending in the mold opening and closing direction, are arranged in alignment with each other, overlying the movable platen 1' and the mold mounting section 13'. Formed in the inner end face of the first driven shaft 46 is a recess 46b, which releasably mates with the projection 41b formed on the distal end face of the motor output shaft 41a.

The core drive apparatus 40' further comprises a second driven shaft 42' similar to the driven shaft 42 of FIG. 1, and a first transmission mechanism formed of a belt 47 which operatively connects the first driven shaft 46 to the second driven shaft 42'. The second driven shaft 42', in conjunction with the first driven shaft 46 and the belt 47, fulfills the same function as the driven shaft 42 of FIG. 1. A through hole for the passage of the belt 47 is bored through each of the bracket 13'c and the top portion of the peripheral wall of the mold mounting section 13'. Furthermore, the core drive apparatus 40' comprises the first and second screw shafts 43 and 44 and the transmission mechanism (second transmission mechanism) 45, which have already been described with reference to FIG. 1.

The core drive apparatus 40' operates substantially in the same manner as the core drive apparatus 40 of FIG. 1. Therefore, a description of the operation is omitted.

The following is a description of a core drive apparatus according to a third embodiment of the present invention.

The third embodiment differs from the first and second embodiments, in which the movable cores, each having the thread corresponding to the threaded portion of each product, is moved in the mold opening and closing direction while being rotated by means of the core drive servomotor which operates so as to rotate its output shaft, in that a movable core having a configuration corresponding to indentations on the outer peripheral surface of a product is linearly moved in a direction perpendicular to the mold opening and closing direction by means of a core drive servomotor which operates so as to rotate its output shaft in the axial direction.

Thus, according to the present embodiment, the movable core is operated for core removal to effect core-off molding, whereby a product with undercut portions can be satisfactorily manufactured. Moreover, the present embodiment differs from the first and second embodiments in that there is no need of any component for converting the rotatory force of the motor output shaft to a linear driving force for the movable core. Thus, the core drive apparatus is simplified in construction and improved in operating accuracy.

Figure 3:
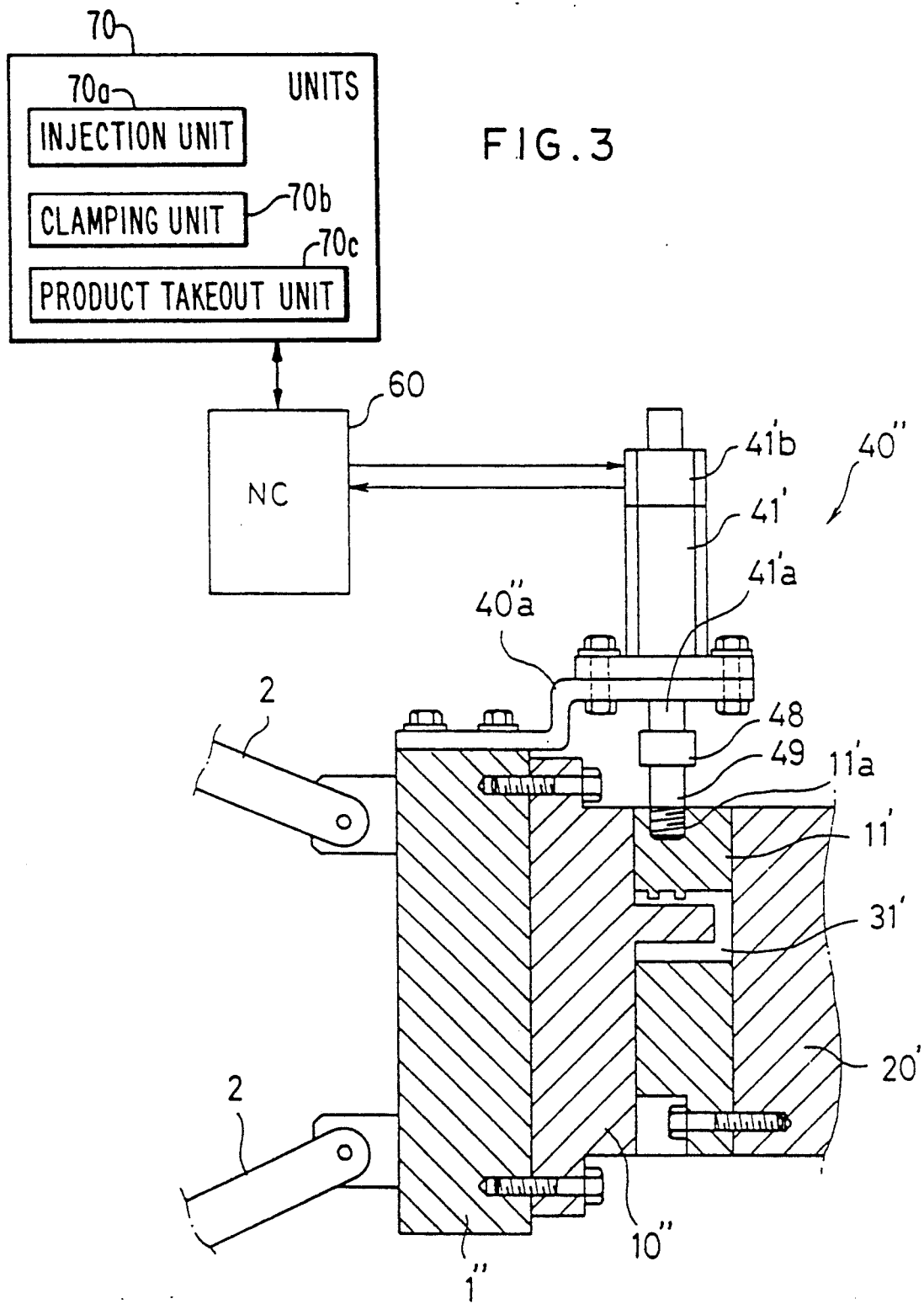
FIG. 3 is a view similar to those of FIGS. 1 and 2, and shows an injection molding machine according to a third embodiment of the present invention.

As shown in FIG. 3, the core drive apparatus 40" is mounted in an injection molding machine which is constructed basically in the same manner as the injection molding machines of the first and second embodiments. In FIG. 3, reference numerals 1" and 2 denote a movable platen and toggle links, respectively, of a mold clamping unit, while numerals 60 and 70 denote a numerical control device and various units, respectively. Numerals 10" and 20' denote movable and stationary molds, respectively. The two molds 10" and 20', in conjunction with the movable core 11', define a molding cavity 31' corresponding to a product which has indentations on its outer peripheral surface. The movable core 11', which has a molding cavity face for defining the indentations on the outer peripheral surface of the product, is attached to the stationary-mold-side end face of the movable mold 10" so that it is slidable in the radial direction of the molds with respect to the movable mold 10".

The core drive apparatus 40" comprises a through-type servomotor 41', whose motor output shaft 41'a is formed of a ball screw threadedly engaged with a ball nut, which is fixed to a hollow shaft, and reciprocates in the axial direction as the motor is operated. The servomotor 41' is fitted with a position sensor 41'b for generating feedback pulses in response to the movement of the output shaft 41'a. The position sensor 41'b is connected to the input circuit of the control device 60, and the control device 60 discriminates the moved position of the motor output shaft 41'a by the feedback pulses. Further, the servomotor 41' is supported above the movable and stationary molds 10" and 20' by means of a bracket 40"a, which is fixed to the top face of the movable platen 1", and the motor output shaft 41'a extends in a direction (radial direction of the molds) perpendicular to the mold opening and closing direction.

The core drive apparatus 40" further comprises a shaft coupling 48 and a connecting shaft 49 for connecting the motor output shaft 41'a to the movable core 11'. The shaft coupling 48, which releasably connects the outer end portion of the connecting shaft 49 to the motor output shaft 41'a, is mounted on the distal end portion of the motor output shaft 41'a so as to be movable along the output shaft 41'a. The connecting shaft 49 has an inner end portion which has a thread on the outer peripheral surface thereof, mating with a tapped hole 11'a formed on the outer peripheral surface of the movable core 11', and the inner end portion of the shaft 49 is screwed in the movable core 11'.

The following is a brief description of the operation of the core drive apparatus 40" of FIG. 3.

When the mold clamping is finished, the servomotor 41' operates under the control of the numerical control device 60, so that the motor output shaft 41'a linearly moves toward the molds 10" and 20' in the radial direction of the molds, whereupon the movable core 11' moves from its retreated position toward its molding position. If it concluded in accordance with the feedback pulses from the position sensor 41'b that the molding position is reached by the distal end of the movable core 11', the rotation of the motor 41' is stopped, so that the movable core 11' ceases to move, and the molding cavity face of the movable core 11' is kept in the molding position. In this state, the injection, dwell, and cooling processes are executed to obtain the product.

When the cooling process is finished, the servomotor 41' is driven so that the motor output shaft 41'a retreats, whereupon the movable core 11' retreats from the molding position to the retreated position. If it is concluded in accordance with the position sensor output that the retreated position is reached by the movable core 11', the drive of the motor 41' is stopped, so that the movable core 11' is kept in the retreated position. Then, the movable mold 10'' is moved away from the stationary mold 20', and the product is taken out of the movable mold 10'' after the completion of mold opening.

The present invention is not limited to the first to third embodiments described above, and various modifications may be effected therein.

In the above embodiments, for example, each movable core used has the molding cavity face which corresponds in shape to the thread portion on the bottom face of each product or indentations on the outer peripheral surface of each product. However, the movable cores may be formed with various molding cavities. Although each movable core is attached to the movable mold according to the embodiments, moreover, the movable core may alternatively be attached to the stationary mold.

In the embodiments described above, furthermore, the core drive apparatus is provided with one servomotor. Alternatively, however, the core drive apparatus used may be one which includes a plurality of servomotors.

In the first and second embodiments, moreover, the position sensors each formed of a limit switch are used for the movable core position detection. Alternatively, however, a position sensor formed of a pulse coder or the like for detecting the motor rotational position may be attached to the core drive servomotor.

We claim:

1. An injection molding machine comprising:
a mold having at least one mold part and at least one movable core;
a group of units including a mold clamping unit having a movable platen, and a core drive apparatus for driving the at least one movable core, the core drive apparatus including a servomotor having an output shaft coupled to the movable platen;
connecting means for operatively connecting the at least one movable core to the output shaft; and
a control device electrically coupled to the servomotor and the mold clamping unit, for controlling the drive of the group of units so that control of the mold clamping unit is independent from control of the core drive apparatus.

2. An injection molding machine according to claim 1, wherein:
the servomotor rotates the output shaft,
said connecting means includes a driven shaft releasably fitted on said output shaft and rotatably supported by said mold, and
said at least one movable core includes at least one screw shaft connected to and threadedly engaged with a tapped hole formed in said mold, further comprising:
a transmission mechanism for transmitting rotatory force of said driven shaft to said at least one screw shaft.

3. An injection molding machine according to claim 2, wherein said transmission mechanism is formed of a first gear fixed to said driven shaft and at least one second gear fixed to said at least one screw shaft, the first gear meshing with the at least one second gear.

4. An injection molding machine according to claim 1, wherein:
the servomotor rotates the output shaft, and
said connecting means includes a first driven shaft releasably fitted on said output shaft and rotatably supported by said mold, a second driven shaft rotatably supported by said mold, at least one screw shaft connected to said movable core and threadedly engaged with a tapped hole formed in said mold, a first transmission mechanism for transmitting a rotatory force of said first driven shaft to said second driven shaft, and a second transmission mechanism for transmitting a rotatory force of said second driven shaft to said at least one screw shaft.

5. An injection molding machine according to claim 4, wherein said first transmission mechanism includes a belt for operatively connecting said first driven shaft to said second driven shaft.

6. An injection molding machine according to claim 4, wherein said second transmission mechanism is formed of a first gear fixed to said second driven shaft and at least one second gear fixed to said at least one screw shaft, the first gear meshing with the at least one second gear.

7. An injection molding machine according to claim 1, wherein said connecting means includes a connector shaft removably attached to said at least one movable core, and a connector for connecting said connector shaft to the output shaft, and wherein the servomotor moves the output shaft in an axial direction relative to the connector shaft.

8. An apparatus for making at least one molded product, comprising:
a mold including at least one movable core and at least one mold part;
a movable platen;
a servomotor fixedly coupled to the movable platen, having a drive shaft movably mounted in the movable platen, the drive shaft coupling with the at least one movable core;
a mold clamping unit coupled to the movable platen, driving the movable platen to drive the at least one movable core in proximity to the at least one mold part to close the mold, and driving the movable platen to drive the at least one movable core away from the at least one mold part to open the mold; and
a control device electronically coupled to the servomotor and the mold clamping unit, controlling the servomotor to move the at least one movable core in a position to form the mold, controlling the servomotor to withdraw the at least one movable core from the at least one molded product made in the mold, and controlling the mold clamping unit to open and close the mold,
control of the mold clamping unit being independent from control of the servomotor.

9. An apparatus as claimed in claim 8, wherein the at least one movable core is threaded and wherein the control device controls the servomotor to rotate the drive shaft to rotate the at least one movable core into the position to form the mold and to withdraw the at least one movable core from the molded product.

10. An apparatus as claimed in claim 8, wherein the at least one movable core is moved along an axial direction of the drive shaft by the servomotor under control of the control device.

11. An apparatus as claimed in claim 8, wherein the at least one movable core includes a plurality of individual movable cores and wherein the at least one mold part includes a plurality of individual mold parts, each one of the plurality of individual movable cores corresponding to one of the plurality of individual mold parts.

12. An apparatus as claimed in claim 8, wherein the drive shaft includes a first gear, and wherein the at least one movable core includes at least one second gear, the first gear meshing with the at least one second gear.

* * * * *